United States Patent
Green

(10) Patent No.: US 7,849,439 B2
(45) Date of Patent: Dec. 7, 2010

(54) APPLICATION-GENERIC SEQUENCE DIAGRAM GENERATOR DRIVEN BY A NON-PROPRIETARY LANGUAGE

(75) Inventor: Kenneth M. Green, Glen Iris (AU)

(73) Assignee: Ixia, Calabasas, CA (US)

( * ) Notice: Subject to any disclaimer, the term of this patent is extended or adjusted under 35 U.S.C. 154(b) by 1391 days.

(21) Appl. No.: 11/038,597

(22) Filed: Jan. 19, 2005

(65) Prior Publication Data

US 2006/0161890 A1 Jul. 20, 2006

(51) Int. Cl.
*G06F 9/44* (2006.01)
(52) U.S. Cl. .................................... 717/105
(58) Field of Classification Search ............ 717/104, 717/109, 105, 113; 719/315; 715/700; 707/20
See application file for complete search history.

(56) References Cited

U.S. PATENT DOCUMENTS

| | | | |
|---|---|---|---|
| 6,170,081 B1 * | 1/2001 | Fontana et al. | 717/104 |
| 6,990,654 B2 * | 1/2006 | Carroll, Jr. | 717/109 |
| 2002/0007483 A1 | 1/2002 | Lopez | |
| 2002/0133588 A1 | 9/2002 | Doyle et al. | |

FOREIGN PATENT DOCUMENTS

| | | |
|---|---|---|
| JP | 8212061 | 8/1996 |
| JP | 2003-273963 | 9/2003 |
| JP | 2003296146 | 10/2003 |
| JP | 2004062840 | 2/2004 |
| JP | 2004094496 | 3/2004 |

OTHER PUBLICATIONS

Elsberry et al, "Using XML and SVG to Generate Dynamic UML Diagrams", Mar. 2003, pp. 1-17.*
"Sequence Diagram tool", [online] Retrieved Dec. 13, 2004; 1 page Retrieved from: http://publib.boulder.ibm.com/infocenter/wsphelp/topic/com.ibm.etools.pd.sd.viewer.doc/.
SequenceDiagram(n) 1.0 SequenceDiagram "Graphics" [online] Retrieved Dec. 15, 2004; 6 pages Retrieved from: file://C:\Documents%20and%20Settings\gm01942\Local%20Settings\Temporary%20Internet%20Files\.
Ambler, S., "UML 2 Sequence Diagrams", Agile Modeling; [online] Retrieved Nov. 17, 2004; 10 pages Retrieved from http://www.agilemodeling.com/artifacts/sequenceDiagram.htm.

(Continued)

*Primary Examiner*—Tuan Anh Vu
(74) *Attorney, Agent, or Firm*—Jenkins, Wilson, Taylor & Hunt, P.A.

(57) ABSTRACT

An application-generic sequence diagram generator is driven by a non-proprietary language. According to one embodiment, a source file describes, in a non-proprietary language, a flow (e.g., a message exchange) of an application. An automatic sequence diagram generator is operable to receive as input the source file, and generate, based on such source file, a sequence diagram representing the flow described by the source file. In an exemplary embodiment, the non-proprietary language is a markup language, such as Extensible Markup Language (XML). The sequence diagram generator is general purpose (or "application-generic"), as it can generate a sequence diagram representing the flow of any application described in the source file. The application for which the source file describes the flow may be any type of application, including without limitation a computer-executable software application, a communication protocol, or any message exchange between actors.

18 Claims, 3 Drawing Sheets

OTHER PUBLICATIONS

"Project: Callflow Sequence Diagram Generator: Summary" [online] 3 pages ;Retrieved Dec. 13, 2004; Retrieved from: http://sourceforge.net/projects/callflow.

"Go Beyond Hieroglyphics", EventStudio 2.5, [online] 3 pages; Retrieved Dec. 13, 2004 Retrieved from: http://www.eventhelix.com/EventStudio/.

Gorman, I.E.: Generic XML Stream Parser API: An easier way to use SAX and Xerces. In: Extreme Markup Languages 2004.

CallFlow Sequence Diagram Generator—Readme, Revision 1.9 Sep. 7, 2003, pp. 106 http://callfow.cvs.sourceforge.net/callflow/README?revision=1..9&view+markup>.

Foreign Search Report for Application GB0601020.1 dated Jun. 14, 2006—4 pages.

Official Action for Great Britain Application No. GB0601020.1 (Jun. 9, 2010).

Official Action for Great Britain Application No. GB0601020.1 (Mar. 23, 2010).

"j2u," Nasra, Retrieved from http://www.nasra.fr/j2u.html (Copyright 2005).

Harel et al., "Message Sequence Charts," pp. 1-29 (Apr. 8, 2003).

\* cited by examiner

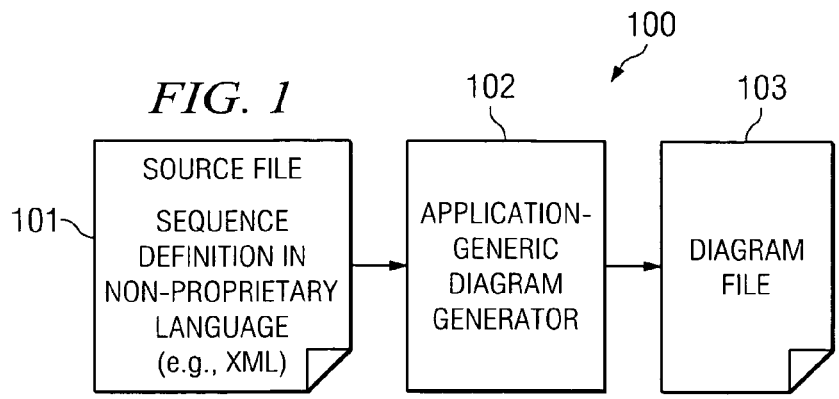
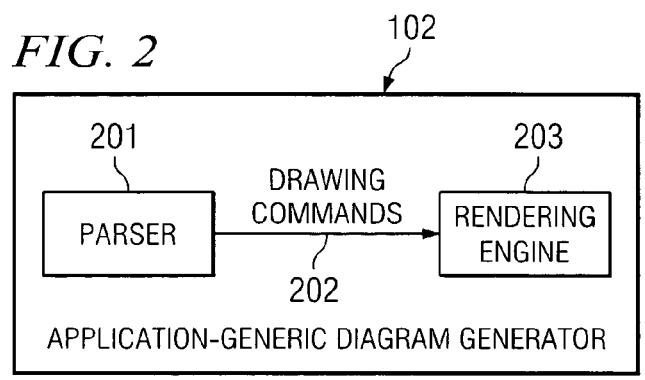
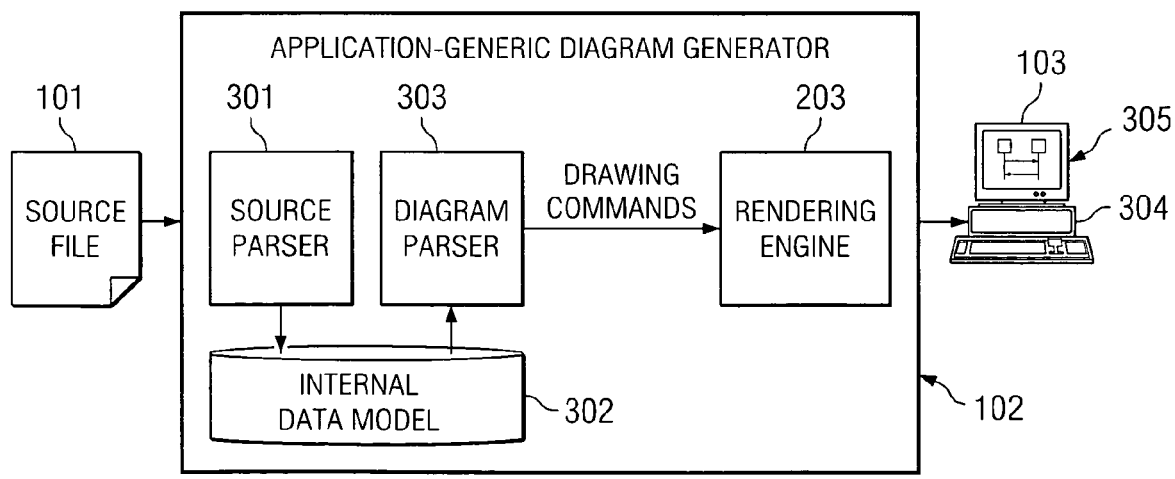

APPLICATION-GENERIC SEQUENCE DIAGRAM GENERATOR DRIVEN BY A NON-PROPRIETARY LANGUAGE

BACKGROUND OF THE INVENTION

Sequence Diagrams (also known as sequence charts, time sequence diagrams/charts, message sequence diagrams/charts, railroad diagrams/charts, or ladder diagrams/charts) are commonly used to provide a graphical representation of a flow of an application. More specifically, sequence diagrams typically provide a graphical representation of a series of transactions, referred to as "messages," between two or more entities, referred to as "actors." In sequence diagrams, time is typically represented by vertical progression down the page. Each actor is typically represented in sequence diagrams by a vertical line (or column). Messages are typically represented by horizontal lines, which are usually labeled and usually end in an arrowhead indicating the direction of communication, between the vertical lines of the actors involved in the exchange. Other decorations are sometimes included in a sequence diagram, such as transaction item numbers or other relationships between the transactions, such as timeouts.

The flow of many types of applications can be represented by sequence diagrams, including without limitation such applications as communication protocols, computer-executable software, assembly line or other manufacturing processes. Indeed, sequence diagrams can be used to represent the flow of message exchanges between actors for any application, such as the flow of messages exchanged between a fruit salesman and a customer desiring to purchase fruit from the salesman. Sequence diagrams can be used to clearly represent the message exchange (or "flow") of an application instead of or in addition to textual description of such message exchange. For instance, in many cases, such applications as communication protocols can be more quickly understood by review of a sequence diagram than by review of a textual description of the application. As with the adage that a picture is worth a thousand words, sequence diagrams greatly aid in conveying the message exchange of a given application.

Accordingly, sequence diagrams are commonly used in specifications, designs, and other documentation to document implementations and as representations of predicted or measured system behavior. In the telecommunications field, for example, sequence diagrams are widely used to document the required, expected, or actual protocol message exchanges.

While sequence diagrams are of great benefit, it is often burdensome to create and maintain them. Traditionally, sequence diagrams have been manually created using basic bitmap editors (e.g., Microsoft Paint), more sophisticated diagramming tools (e.g., Microsoft Visio), or sometimes dedicated CASE tools (e.g., Rational Rose). Creating sequence diagrams in these manners requires that both the original author and the maintainer have access to appropriately licensed versions of the compatible tools. Further, the sequence diagram creator is required to make decisions about style and layout, although some tools provide assistance in these areas. This manual approach consumes a lot of time and labor and discourages the inclusion of sequence diagrams in documentation due to the high cost of creating and maintaining them.

More recently, automatic diagram generation tools have been developed that can generate sequence diagrams from an input textual file that describes the transaction sequences of an application. Thus, such automatic diagram generation tools alleviate the requirement of a user manually creating sequence diagrams. Automatic diagram generation tools available in the prior art include the following: EventStudio 2.5 available from EventHelix.com (see http://www.eventhelix.com/EventStudio/), Callflow Sequence Diagram Generator available from SourceForge.net (see http://sourceforge.net/projects/callflow), the Sequence Diagram Tool provided in the WebSphere Studio Application Developer available from International Business Machines (IBM), and J2u available from NASRA (see http://www.nasra.fr/).

Prior automatic diagram generation tools typically require use of a proprietary language for defining a textual description in a source file. Thus, a user may be required to learn a proprietary language in order to generate the proper textual description to be used by the automatic diagram generation tool.

Further, some automatic diagram generation tools are not application generic. Rather, certain automatic diagram generation tools are restricted for use in generating sequence diagrams for only specific types of applications, and thus lack the flexibility to generate a sequence diagram for any desired type of application. For instance, the Sequence Diagram Tool provided in the WebSphere Studio Application Developer is capable of receiving Java source code as a source file, and is operable to generate a sequence diagram representing the flow of the received Java source code. Thus, while this tool does not require a user to learn a proprietary language in order to generate a source file (but instead the Java source code can be input as the source file), it is application-specific in that it is capable of only generating sequence diagrams for the input Java source code. Thus, for instance, this tool is not able to receive a textual source file describing, for example, the message exchange between a customer and a fruit salesman and generate a sequence diagram for that application, but is instead limited to generating a sequence diagram representing the flow of the Java source code input to it. Thus, certain sequence diagram generation tools are not general purpose sequence diagram generators, but rather are focused on specific applications or specific tasks, such as reverse-engineering existing source code or automatically documenting software runtime behavior from runtime traces.

Additionally, automatic sequence diagram generation tools of the prior art generally do not allow command-line operation and hence cannot be integrated into an end-user's document publishing automation process. Thus, there is generally no efficient way for a user to create a group of diagrams utilizing prior automatic sequence diagram generators. Rather, a user is generally required to sit in front of the computer and enter information (e.g., a source file) to generate one diagram at a time.

BRIEF SUMMARY OF THE INVENTION

In view of the above, a desire exists for an automatic sequence diagram generator that is capable of receiving a source file that defines a flow (e.g., message exchange) of an application in a non-proprietary language. Further, it is desirable that such automatic sequence diagram generator be a general purpose (or "application-generic") diagram generator, rather than being restricted to generating sequence diagrams for a specific application.

The present invention is directed to a system and method which provide an application-generic sequence diagram generator that is driven by a non-proprietary language. According to one embodiment, a source file describes, in a non-proprietary language, a flow (e.g., a message exchange) of an application. An automatic sequence diagram generator is operable to receive as input the source file, and generate, based on such source file, a sequence diagram representing the flow described by the source file.

In an exemplary embodiment, the non-proprietary language is a markup language, such as Extensible Markup Language (XML). Thus, a user is not required to learn a proprietary language in order to create a source file to be used by the sequence diagram generator, but can instead describe the flow to be diagrammed in, for instance, XML. Further, the sequence diagram generator is general purpose (or "application-generic"), as it can generate a sequence diagram representing the flow of any application described in the source file. The application for which the source file describes the flow may be any type of application, including without limitation a computer-executable software application, a communication protocol, or any message exchange between actors (e.g., a message exchange between a customer and a fruit salesman).

According to one embodiment, the sequence diagram generator includes a source parser, a diagram parser, and a rendering engine. The source parser receives the textual source file and builds, based on the received source file, a data model for a diagram of the flow described by the source file. The diagram parser processes the data model built by the source parser to generate corresponding drawing commands, which are input to the rendering engine. Responsive to receipt of the drawing commands, the rendering engine generates a sequence diagram representing the flow described by the textual source file.

In various embodiments described herein, the textual source file is independent of the application for which the textual source file defines the flow. For instance, the textual source file describes a flow of an application (e.g., a communication protocol or other exchange of messages between actors) for which a sequence diagram is to be generated, rather than the source file itself being the application for which a sequence diagram is to be generated. As an example, the textual source file may be an XML file that describes the flow of a Java program. Thus, the XML file is independent of the Java program, as opposed to the source code of the Java program being used as input to the sequence diagram generator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows an exemplary system that includes a sequence diagram generator according to an embodiment of the present invention;

FIG. 2 shows a sequence diagram generator according to certain embodiments of the present invention;

FIG. 3 shows in greater detail a sequence diagram generator according to one exemplary embodiment of the present invention;

DETAILED DESCRIPTION OF THE INVENTION

Figure 4:
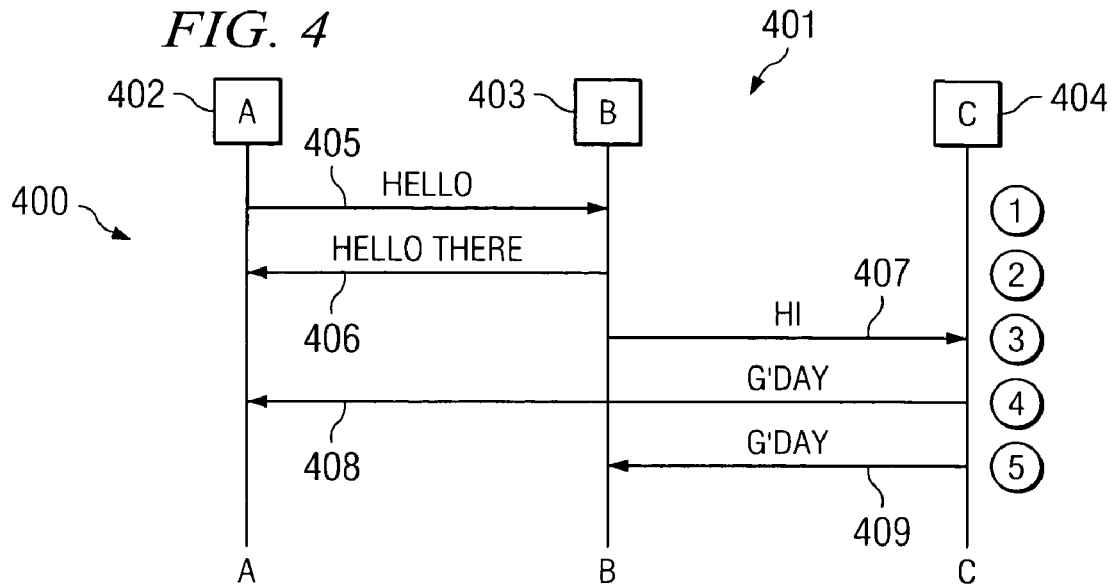
FIG. 4 shows an exemplary sequence diagram that may be generated by a sequence diagram generator according to one embodiment of the present invention.

Exemplary embodiments of the present invention are now described with reference to the above figures, wherein like reference numerals represent like parts throughout the several views. Turning to FIG. 1, an exemplary system 100 is shown, which includes a sequence diagram generator 102 that is operable to receive as input a textual source file 101 and generate therefrom a sequence diagram 103. Sequence diagram 103 may be stored to a file and/or output (e.g., to a display device), as examples. According to various embodiments described herein, source file 101 describes the flow (e.g., message exchange) of an application, such as a communication protocol, etc., in a non-proprietary language, such as XML. Sequence diagram generator 102 can be referred to as a general-purpose or application-generic sequence diagram generator because it is operable to generate a sequence diagram for any type of application for which a flow is described in source file 101.

Additionally, as described further herein, the textual source file 101 is independent of the application for which it defines a flow. For instance, the textual source file describes a flow of an application (e.g., a communication protocol or other exchange of messages between actors) for which a sequence diagram is to be generated, rather than the source file itself being the application for which a sequence diagram is to be generated. As an example, the textual source file 101 may be an XML file that describes the flow of a Java program. Thus, the XML file is independent of the Java program, as opposed to the source code of the Java program being used as input to the sequence diagram generator 102. Accordingly, the sequence diagram generator 102 is not restricted to generating a sequence diagram for the flow of the source file input thereto, but rather is operable to generate a sequence diagram for the flow of any application described by the source file input thereto.

FIG. 2 shows diagram generator 102 according to certain embodiments of the present invention. As shown, diagram generator 102 includes a parser component 201 and a rendering engine 203. Parser component 201 is operable to, based on the input textual source file 101, generate drawing commands 202 to rendering engine 203 to cause rendering engine 203 to generate sequence diagram 103 representing the flow described in source file 101.

According to this exemplary embodiment, the source file 101 provides, in non-proprietary language (e.g., XML), a sequence definition for a flow of an application. The source file is input to sequence diagram generator 102, which parses the data of the source file 101 and renders the sequence diagram 103 either on a display screen or to a file in one of several formats (bmp, gif, jpg etc.). Parser 201 is responsible for reading and interpreting the input data (e.g., XML) of the source file 101 to extract the element definitions. Rendering engine 203 is responsible for rendering the drawing elements using its internal style and layout rules. The rendering engine application program interface (API) presents an abstraction appropriate for drawing sequence diagrams, which is independent of any domain-specific application of the diagrams. Parser 201 maps between domain-specific encoding in the source file (e.g., the XML) and the rendering API. This allows rapid adaptation of the sequence diagram generator 102 to a wide range of domains without having to change the core drawing logic that controls style and layout.

The rendering engine 203 and its corresponding API may be any that are now known or later developed to provide the capability of receiving drawing commands and generating a sequence diagram in accordance with such drawing commands. The parser 201 (and more particularly the diagram parser 303 described in the exemplary embodiment of FIG. 3 below) should have knowledge of the rendering engine API such that it can generate the appropriate drawing commands to cause the rendering engine to take the correct actions in generating the proper sequence diagram. In certain embodiments, the rendering engine's API may be developed to have particular applicability in drawing sequence diagrams (e.g., to be capable of receiving actors, message sequences, etc., and draw the corresponding features to represent the message sequences between the actors), but this is not a requirement for implementing the concepts described herein.

Sequence diagram generator 102 according to one exemplary embodiment is shown in further detail in FIG. 3. In this illustrative embodiment, sequence diagram generator 102 includes a source parser 301, diagram parser 303, and rendering engine 203. Thus, in this illustrative embodiment, parser component 201 of FIG. 2 comprises source parser 301 and diagram parser 303. Source parser 301 receives source file 101 as input and builds internal data model 302 based on such source file 101. More specifically, source parser 301 reads the text of source file 101, checks its syntax, and builds internal data model 302, which represents all the diagram metadata information read from source file 101. Internal data model 302 preserves the hierarchy and relationships expressed in source file 101.

In one exemplary embodiment, the source file is in XML and the source parser 301 parses XML elements to extract the data from the source file to generate data model 302. More specifically, in one exemplary implementation, the XML source file 101 is loaded into a DOM (Document Object Model) by the source parser 301. The DOM is a tree structure that captures all the data from the XML, including its hierarchy. The DOM is searched by the source parser 301 for diagram metadata which is then extracted into a set of internal data structures 302 that describe the actors and all transactions and decorations. The transaction data is further processed to extract all the source and destination information. This collection of internal data 302 is then used to drive the rendering process. Diagram metadata is recognized by source parser 301 in the XML source by the unique set of XML tags, examples of which are described further below.

Diagram parser 303 processes the data in internal data model 302 to extract the features that are to be represented in the sequence diagram, and based on such internal data model 302, diagram parser 303 generates a sequence of abstract diagram drawing commands to the rendering engine 203. Rendering engine 203 receives the drawing commands and transforms such commands into low-level operating system graphical operations (such as drawing lines, circles, or text) to create sequence diagram 103, which may be output on a display 305 of a processor-based device (e.g., a personal computer) 304 and/or stored to a file, as examples.

To illustrate operation of one embodiment, consider a simple case of a conversation between three actors A, B, and C being described in source file 101, which is then used by diagram generator 102 to generate a sequence diagram 103 representing the exchange of messages between the actors in such conversation. Thus, in this case, the conversation between the actors is considered an application, and the flow of such application is described in the source file 101. Suppose the conversation is as follows:

A says "Hello" to B;
B says "Hello there" to A and "Hi" to C; and
C says "G'day" to B and to A.

In this exemplary embodiment, the source file 101 is expressed in XML, and the above conversation can be represented by the following XML source file 101:

```
<?xml version="1.0" standalone="yes"?>
<SequenceDefinition title="A Simple Diagram">
    <MessageSequence>
        <Message from="A" to="B" msg="Hello"/>
        <Message from="B" to="A" msg="Hello there"/>
        <Message from="B" to="C" msg="Hi"/>
        <Message from="C" to="A" msg="G'day"/>
        <Message from="C" to="B" msg="G'day"/>
    <MessageSequence/>
</SequenceDefinition>
```

As is well-known, XML allows elements to be defined with tags. XML is a "markup" language, which can contain markup symbols to describe the content of a page or file. XML describes the content of a file in terms of what data is being described. For example, the word "phonenum" placed within markup tags could indicate that the data that follows is a phone number. Thus, XML allows elements, such as the "phonenum" element in this example to be defined. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed. XML is "extensible" because, unlike HTML, the markup symbols are unlimited and self-defining. In the above exemplary XML code, the elements SequenceDefinition, MessageSequence and Message are defined. The SequenceDefinition element in this case is the outer-most tag which encloses a complete definition of a single diagram. The SequenceDefinition element includes a "title" attribute which can be used to provide a title for the diagram. The MessageSequence element encloses the set of transactions between actors, and each message element defines a single transaction between the "from" and "to"

actors using the annotation given by the "msg" attribute. A program parsing an XML file (e.g., source parser 301) can determine that the file includes a sequence definition by searching for the SequenceDefinition element. The parser can then assume that all content found between the opening and closing SequenceDefinition tags is related to the definition and should conform to the expected syntax of such a definition, in this case being at least one MessageSequence tag set containing one or more message tags.

Source parser 301 receives the above XML of source file 101, and parses it into the internal data model 302. The internal data model 302 derived from the above exemplary XML code might look like the following:

```
DiagramData {
    { Title        {"A Simple Diagram"}}
    { ActorList {ABC}}
    { MessageList {{A B "Hello"}
    {B A "Hello there"} {B C "Hi"} {C A
"G'day"} {C A "G'day"}}}
```

The source parser 301 has explicit knowledge of the source file format and syntax in order to be able to extract the information needed for constructing a diagram. This knowledge is specific to each particular source file type and, indeed, could change over time or be different for different embodiments of the invention. Separating source parser 301 from the diagram parser 303 via the internal data model 302 in this manner allows for an implementation that can rapidly adapt to different source file formats without requiring changes to the fundamental diagram generation process. Hence a single implementation might support a number of different XML syntaxes or indeed, other file formats altogether, perhaps structured text similar to a windows ".ini" file, or any other arbitrary input format. Such an implementation would have to have one source parser 301 implementation for each supported format, but only a single implementation of each of the internal data model 302, diagram parser 303, and rendering engine 203.

In addition, in certain embodiments some of the information needed to create the sequence diagram 103 may not be explicitly provided in the source file 101, but is instead derived from the available data once it has all been parsed. In such case, it is not viable to directly generate rendering engine commands from a single pass through the source file 101, but instead data must be stored until a complete set can be created. In the example, the complete list of actors can only be determined once all of the message elements have been parsed. However, the complete list of actors has to be known before the diagram can be generated.

Once the above XML of source file has been parsed into internal data model 302, diagram parser 303 processes such internal data model 302 and generates a sequence of diagram drawing commends. For the above example and an exemplary Rendering Engine API, the set of commands could be as follows::

```
SequenceDiagram::sequencediagram .myDiag -title "A Simple Diagram"
myDiag add actor -id A
myDiag add actor -id B
myDiag add actor -id C
myDiag add message -from A -to B -text "Hello"
myDiag add message -from B -to A -text "Hello there"
myDiag add message -from B -to C -text "Hi"
myDiag add message -from C -to A -text "G'day"
myDiag add message -from C -to B -text "G'day"
myDiag refresh
```

Rendering engine 203 receives the above drawing commands and generates the exemplary sequence diagram 400 of FIG. 4. As shown in FIG. 4, sequence diagram 400 includes title 401 of "A Simple Diagram", as specified in the above exemplary XML source file 101. Further, sequence diagram 400 includes actors A (402), B (403) and C (404), as defined by the above exemplary XML source file. Sequence diagram 400 illustrates, via arrow 405, that actor A says "Hello" to actor B. Sequence diagram 400 illustrates, via arrows 406 and 407, that actor B says "Hello there" to actor A and "Hi" to actor C. Finally, sequence diagram 400 illustrates, via arrows 408 and 409, that actor C says "G'day" to actors A and B.

It should be recognized from the illustrative conversation used in the above example, that the flow of any application (e.g., communication protocols, etc.) can be described in an XML source file, which is used by sequence diagram generator 102 to generate a sequence diagram representing the flow of such application.

Figure 5:
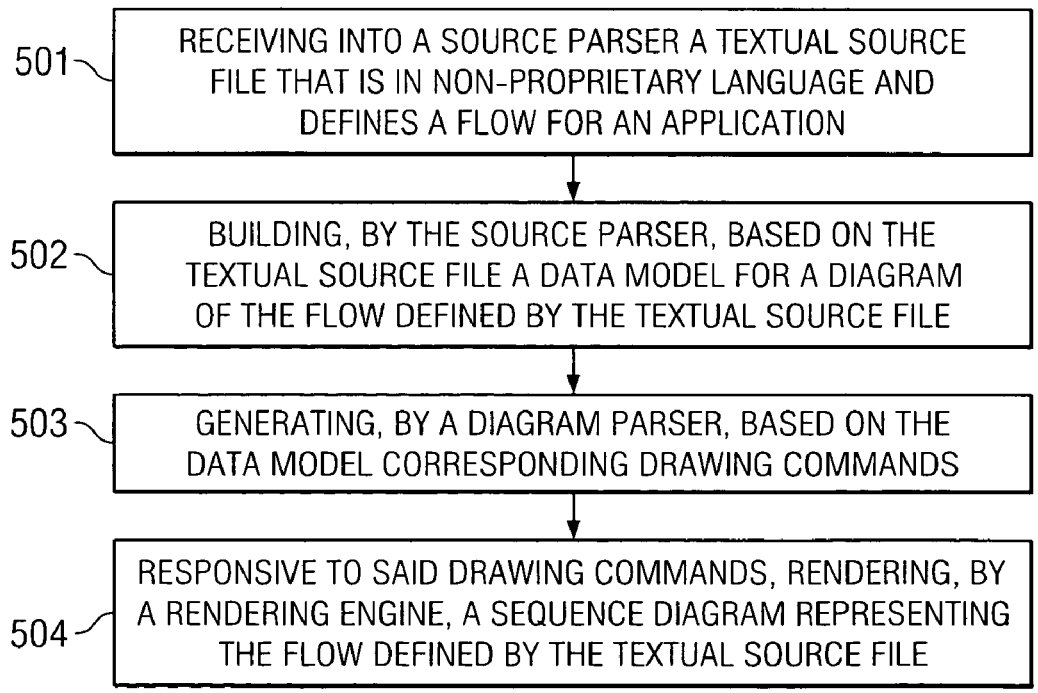
FIG. 5 shows an operational flow diagram of a sequence diagram generator according to one embodiment of the present invention.

Turning to FIG. 5, an operational flow diagram of a sequence diagram generator according to one embodiment is shown. In operational block 501, a source parser 301 receives a textual source file 101 that is in non-proprietary language (e.g., XML) and defines a flow for an application (e.g., a conversation between two or more actors, a communication protocol, etc.). In operational block 502, the source parser 301 builds, based on the textual source file 101, a data model 302 for a diagram of the flow defined by the textual source file 101. In operational block 503, diagram parser 303 generates, based on the data model 302, corresponding drawing commands. In operational block 504, responsive to receiving the drawing commands, a rendering engine 203 renders a sequence diagram 103 representing the flow defined by the textual source file 101.

As mentioned above, in certain embodiments XML is used in the source file for describing the sequence (or "flow") of an application. Exemplary XML elements that are used in one embodiment are described further below.

As mentioned above, according to one embodiment a sequence is defined in the XML using a SequenceDefinition Element. The various XML elements that make up a sequence description in one embodiment are provided in Table 1 below.

TABLE 1

| Element | No. of occurrences in its container | Description |
| --- | --- | --- |
| SequenceDefinition | 1 or more | Outer-most element of a set of transaction definitions. |
| GroupDefinitions | 0 or more | Container for a set of Group records. |
| Group | 0 or more | Defines a unique group identifier and a set of attributes for the group. |
| ActorRoleMap | 0 or more | Container for a set of ActorRole records. |
| ActorRole | 0 or more | Defines a mapping between a simple entity ID and a role name and optionally associates the Actor with a Group. |
| MessageSequence | 0 or more | Container for a set of transaction records (Headings, Links and Messages). |
| Heading | 0 or more | Defines a heading to be overlaid on the diagram. |
| Link | 0 or more | Defines a link annotation to be overlaid on the diagram between two |

TABLE 1-continued

| Element | No. of occurrences in its container | Description |
|---|---|---|
| | | message transactions. If the from attribute is not provided then the link will be from the transaction defined by the first preceding Message element. If the to attribute is not provided then the link will be to the transaction defined by the first following Message element. |
| Message | 0 or more | Defines a transaction between two entities that is to be represented as a horizontal arrow between those entities. |

It should be noted that to support operation of serial/single-pass XML parsers, the GroupDefinitions element should appear prior to the ActorRoleMap and the ActorRoleMap prior to any Heading, Link or Message elements. The order of ActorRole elements within the ActorRoleMap defines the left to right order of the Actors in the diagram.

Heading, Link and Message elements can all appear zero or more times and be in any order. Their order defines their top-to-bottom placement down along the vertical time axis in the diagram.

The SequenceDefinition Element attribute definitions according to one embodiment are provided in Table 2 below.

TABLE 2

| Attribute Name | Mandatory (M) or Optional (O) | Format | Description |
|---|---|---|---|
| Version | M | n.n | Version of this instance of the XML structure (latest version is 1.0) |
| Title | O | text | If present, then defines a title that will written at the top of the generated diagram |
| Titlecolor | O | #hhhhhh | RGB color definition for the color to be used for the title text (default = #000000 = black). |
| titlebackground | O | #hhhhhh | RGB color definition for the color to be used the background of the title block (default = #d9d9d9 = grey85). |
| Titleborder | O | #hhhhhh | RGB color definition for the color to be used for the border of the title block (default = same as titlebackground). |
| Linkcolor | O | #hhhhhh | RGB color definition for the color to be used for the link lines and text (default = #ff0000 = red). |

The ActorRole Element attribute definitions according to one embodiment are provided in Table 3 below.

TABLE 3

| Attribute Name | Mandatory (M) or Optional (O) | Format | Description |
|---|---|---|---|
| Id | M | text | A brief and unique identifier for an actor. (eg T1, T2, D1 etc) |
| Name | O | text | An instance-specific name for the actor that describes its role (eg UNI-N) |
| Group | O | text | A group ID defined by one of the entries in the GroupDefinitions element |

The Group Element attribute definitions according to one embodiment are provided in Table 4 below.

TABLE 4

| Attribute Name | Mandatory (M) or Optional (O) | Format | Description |
|---|---|---|---|
| Name | M | text | Unique name for the actor (eg. TestPort or Dut). |
| Titlecolor | O | #hhhhhh | RGB color definition for the color to be used for the actor titles for actors that are members of this group (default = #000000 = black). |
| Linecolor | O | #hhhhhh | RGB color definition for the color to be used for transaction originating from actors that are members of this group (default = #000000 = black). |
| messagecolor | O | #hhhhhh | RGB color definition for the color to be used for transaction labels on transactions originating from actors that are members of this group (default #000000 black). |

The Actor Element attribute definitions according to one embodiment are provided in Table 5 below.

TABLE 5

| Attribute Name | Mandatory (M) or Optional (O) | Format | Description |
|---|---|---|---|
| Name | M | text | Unique name for the actor (eg T1, T2, D1 etc). This will appear as the title for the actor's column in the diagram (see Group titlecolor attribute). |
| Role | O | #hhhhhh | RGB color definition for the color to be used for the actor titles for actors that are members of this group (default = #000000 = black). |
| Group | O | #hhhhhh | RGB color definition for the color to be used for transactions |

TABLE 5-continued

| Attribute Name | Mandatory (M) or Optional (O) | Format | Description |
|---|---|---|---|
| | | | originating from actors that are members of this group (default = #000000 = black). |

The Heading Element attribute definitions according to one embodiment are provided in Table 6 below.

TABLE 6

| Attribute Name | Mandatory (M) or Optional (O) | Format | Description |
|---|---|---|---|
| Text | M | text | A short description of the purpose of the following message exchange (eg "Connection Setup") |

The Message Element field definitions according to one embodiment are provided in Table 7 below.

TABLE 7

| Attribute Name | Mandatory (M) or Optional (O) | Format | Description |
|---|---|---|---|
| From | M | text | Must be a a valid Actor id value (eg T1) |
| To | M | text | Must be a a valid Actor id value (eg D1) |
| Msg | M | text | Brief message/transaction type label (eg "PATH (Create)" or "ACK'). Line breaks can be inserted into the text in the diagram by including the character "~" in the text. For example "PATH~(Create)" will be drawn with "PATH" on one line and "(Create)" left aligned beneath it on the next line. |
| Transaction | O | text | Controls the transaction ID assigned to the message. Normally an ID is assigned from an automatically incrementing counter that starts from one for the first transaction. Messages that do not have a transaction ID cannot be sources or destinations for Links. Must be one of: auto, none, <value> (Default: auto) auto: automatically assign a transaction ID none: do not treat this message as a transaction <value>: use the specified value as the transaction ID (must |

TABLE 7-continued

| Attribute Name | Mandatory (M) or Optional (O) | Format | Description |
|---|---|---|---|
| | | | be unique across all messages for the diagram) |
| Decoration | O | Text | Specifies a decoration to be drawn over the mid-point of the arrow associated with this message. Normally no decoration is drawn. Must be one of: ban, cross, none (Default: none) ban: draw a 'circle-with-diagonal-slash' over the arrow cross: draw an 'X' over the arrow none: no decoration |

The Link Element field definitions according to one embodiment are provided in Table 8 below.

TABLE 8

| Attribute Name | Mandatory (M) or Optional (O) | Format | Description |
|---|---|---|---|
| From | M | text | Must be a transaction number. That is, the index of the Message element which is the source. The indices start from one for the first Message element found and increment by one for each subsequent Message element. |
| To | M | text | Must be a transaction number (see from) |
| Msg | M | Text | Brief text used to label the link (eg "500 ms"). Line breaks can be inserted into the text in the diagram by including the character "~" in the text (eg "50~ms") |

In view of the above, embodiments of the present invention enable automatic generation of high quality sequence diagrams from simple textual descriptions. Such automatic generation of sequence diagrams addresses issues of uniformity of style, standardized layout, ease of maintenance, and the ability to handle arbitrarily large data sets or rapidly regenerate diagrams when data changes, which are problematic in manual creation/maintenance of sequence diagrams.

As described, embodiments are provided that support textual descriptions written in a non-proprietary language (e.g., XML). In the past, proprietary languages have been defined to describe the message exchanges (for example, EventStudio, http://www.eventhelix.com/EventStudio/). One embodiment of the present invention enables use of XML, a non-proprietary language, to express the input data to the diagram generation engine. Numerous free and commercial tools are widely available for writing and editing XML files. The syntax and structure of XML is widely known and easily learned. The use of XML, a standard and well-supported language, makes it quicker and easier for end-users to achieve their goals without having to learn new or proprietary languages. An exemplary definition of an XML format for specifying sequence transactions is provided above. An XML-schema can thus be developed explicitly defining the syntax of the transaction files. Of course, the scope of the present invention is not limited to the particular syntax described herein, but rather any suitable syntax that may be developed may be utilized in accordance with the concepts described herein.

Certain embodiment of the present invention further enable interactive editing of the message definition data. That is, a graphical user interface (GUI) is provided that allows a user to edit the input data (source file 101) on screen and then regenerate a sequence diagram on demand to see the consequences of the changes made to the input data. This is achieved by loading the source file in its entirety into an intermediate variable. The content of this variable is displayed in the GUI as editable text. Each time the user requests regeneration of the diagram the content of this variable is fed into the source parser as if it had come from the source file itself. This speeds up the development of valid input data by providing immediate feedback of how the generated diagram will appear.

Further, certain embodiments of the present invention provide a command-line engine for static diagram generation. That is, a command-line engine is provided that allows diagrams to be automatically generated and saved to files and/or displayed. This allows the diagram generation process to be integrated into the end-user's publishing automation processes. In one example of such an embodiment, the command-line engine received as input a set of command-line parameters defining the list of input files ("Source files") to be processed, the desired diagram file format, and the destination directory into which the generated files (i.e., the generated sequence diagrams) should be written. Below is an example of such a command-line according to one embodiment:

---
generatediagrams - srcdir "c:/My xml" -
filepattern * .xml -imageformat jpg -outdir
"c:/My Pictures"
---

In this example, all files found in the directory "c:/My xml" that match the pattern "*.xml" are processed, one at a time, by the diagram generator. For each input file, the generator creates an output file in JPEG format in the directory "c:/My Pictures". Such an embodiment allows the automatic generation of tens, hundreds, or even thousands of sequence diagrams without user interaction being required for each generation. The command-line engine may also be used to generate diagrams on-demand. One embodiment in which this makes sense is for a Test Manager application in which each test case could have a unique description, including the definition of a sequence. In order to avoid the maintenance cost of keeping diagrams in online help up-to-date with the content of each test case, the Test Manager application could generate, via the command-line engine, the diagram for any given test case on demand when the user opened the help page for that particular test case.

Certain embodiments of the present invention further provide a runtime engine for dynamic diagram generation. This allows the ability to provide a runtime engine that can be integrated into GUI applications and can generate diagrams on demand from data provided dynamically by the encapsulating application. An example of this approach is the automatic generation of a sequence diagram from a sequence of packets captured by a Protocol Analyzer. In such an application, the source file is the captured data packets. The implementation of the source parser in this application extracts information from each captured packet in order to build up the internal data model from which the diagram showing the flow of packets can then be generated. In such an application, the diagram can be generated on-the-fly as each packet is captured or on-demand when the user of the Protocol Analyzer application requests a diagram for the set of packets currently in the capture buffer.

In certain embodiments, the sequence diagram generator can be implemented as part of an overall document generation tool. Thus, the automatic generation of sequence diagrams can be integrated into wider document automation processes, dynamically generating the diagrams that are integrated with enclosing text taken from common or diverse sources and combined into a final integrated document.

An example of this approach is the automated generation of a specification document in HTML from an original specification written in XML. The XML would contain the complete specification details, including both the specification text and the sequence diagram definition(s).

The advantage of this approach is that the content of the specification can be captured and maintained in a single source file, while the publication-quality output, including sequence diagrams, can be automatically generated. The appearance of the generated output can be changed quite independently from the content, which is stored in the original XML source file.

The process can be extended to provide batch processing of a number of input specifications, one after the other. For example, a group of specifications might be grouped together in a single directory, or spread across a number of directories from a common root. In this case the document generator can be designed to iterate over the directories searching for input files of the right format, and processing each in turn. Input files might be recognized by a defined file naming convention, by being located in a predefined directory or sub-directory, or by inspecting their content looking for a match to the expected XML format.

Figure 6:
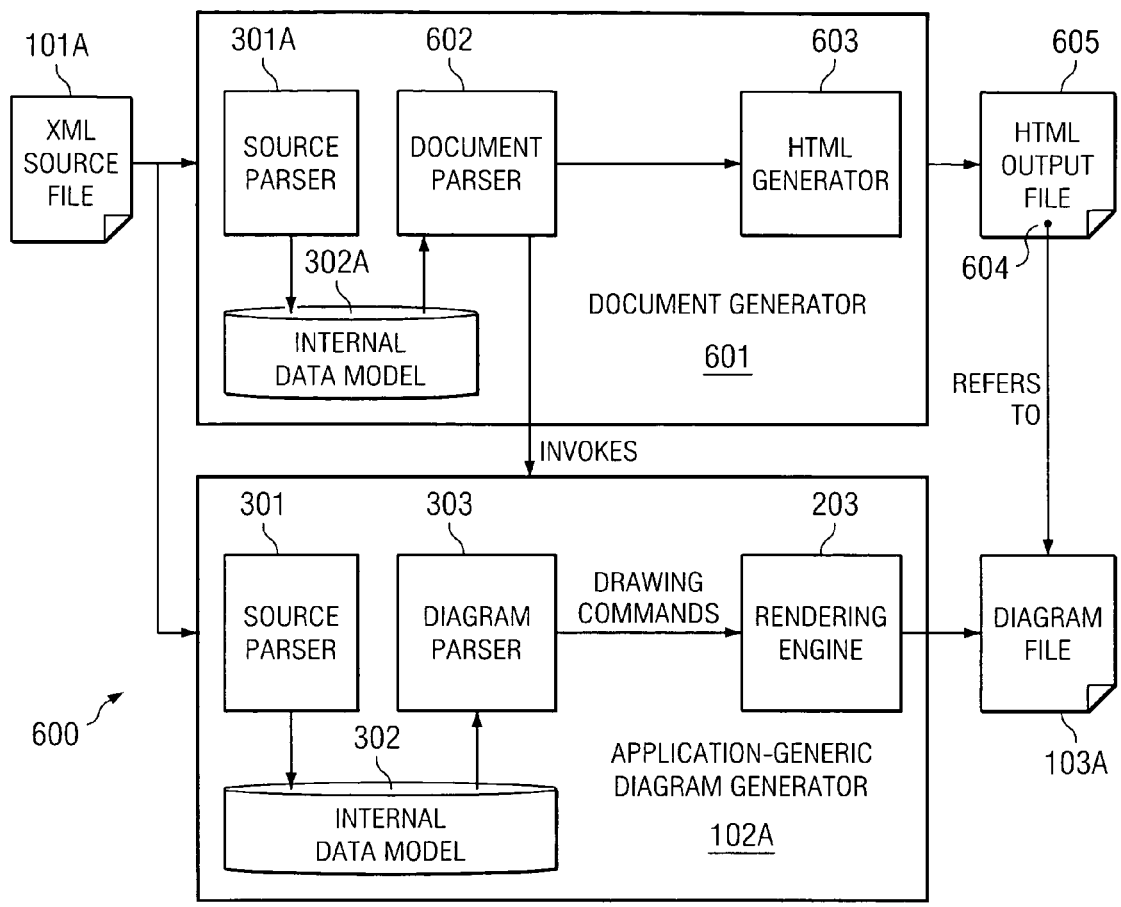
FIG. 6 shows an exemplary system in which a document generator and sequence diagram generator are implemented as separate components that may be used in parallel to generate an overall document (having both text and sequence diagrams) from a source file.

Turning to FIG. 6, an exemplary system 600 is shown in which a document generator 601 and sequence diagram generator $102_A$ are implemented as separate components that may be used in parallel to generate an overall document (having both text and sequence diagrams) from a source file $101_A$, which in this case is an XML source file. In this case, source parser $301_A$ of the primary document generation application 601 parses the input source file $101_A$ to build up its internal data model $302_A$. For instance, data model $302_A$ identifies the elements in the source file $101_A$, such as the textual elements and sequence diagram elements that are described in the source file $101_A$. For the sequence diagram elements identified by source parser $301_A$, the source parser $301_A$ may include in data model $302_A$ such information as an identifier indicating that the corresponding portion of the source file $101_A$ describes a sequence diagram element, the source file name, and/or the output file name to be used for the generated sequence diagram (generated in the manner described below by the diagram generator $102_A$), as examples. The internal data model $302_A$ built by source parser $301_A$ maintains the relationships and hierarchy of the various elements (e.g., textual elements and sequence diagram elements) described in the source file $101_A$. Thus, the resulting output document 605 can be generated to maintain the relative order in which the various textual and sequence diagram elements occur in the source file $101_A$.

From data model $302_A$, document generator 601 generates the various sections of the output document 605, in this example in HTML. More specifically, the document parser 602 uses the information in data model $302_A$ to identify the textual portions of source file $101_A$ to be written to the HTML output document 605, as well as identifying the sequence diagram elements. Each instance of a sequence diagram definition in the source file $101_A$ becomes a reference 604 in the generated HTML document 605 to an external image file $103_A$ (e.g. an <img src="xxx">tag).

The input source file $101_A$ is also fed to the diagram generator application $102_A$, which creates an output diagram file $103_A$ for each sequence diagram definition in the source file $101_A$ in the manner described above. In this example, upon document parser 602 encountering a sequence diagram element identified in the internal data model $302_A$ for source file $101_A$, such document parser 602 invokes diagram generator $102_A$ and causes such diagram generator to generate the corresponding sequence diagram. Thus, the sequence diagram generator $102_A$ accesses the source file $101_A$, identifies the corresponding sequence diagram element defined therein, and generates the appropriate sequence diagram $103_A$ based on the source file's description in the manner described above (e.g., with sequence diagram generator 102 of FIG. 3). That is, source parser 301 parses the XML source file $101_A$ and populates internal data model 302 with information corresponding to the identified sequence diagram(s) described in such source file $101_A$ in the manner described above in connection with FIG. 3. The diagram parser 303 parses the internal data model 302 and generates drawing commands to rendering engine 203 in order to generate a sequence diagram file $103_A$ in the manner described above.

Thus, in this exemplary embodiment, the source parser $301_A$ (of the document generator 601) reads the source text $101_A$, checks the syntax and builds an internal data model $302_A$ representing all the information read from the source $101_A$ to be included as textual content in a document 605 to be generated, while source parser 301 (of sequence diagram generator $102_A$) reads the source text $101_A$, checks the syntax and builds an internal data model 302 representing all the sequence diagrams described in the source $101_A$. The data models 302 and $302_A$ preserve the hierarchy and relationships expressed in the source $101_A$ (e.g., of the textual content and the sequence diagrams). The document parser 602 of the document generator 601 processes the model data $302_A$ to identify the sections to be generated in the document 605 and extract the content for each section. Document parser 602 then generates a sequence of output formatting commands to the HTML Generator 603. HTML Generator 603 transforms the formatting commands into well-formed HTML and writes it to the output file 605.

Thus, document generator 601 uses the source file $101_A$ to create the text for the output file 605 and to create references (e.g., hyperlinks) 604 to the sequence diagrams identified in the source file $101_A$, and the diagram generator $102_A$ creates the sequence diagrams $103_A$ identified in the source file $101_A$. Accordingly, in certain embodiments, reference 604 may be a hyperlink within document 605 to the corresponding sequence diagram such that a user may click on the hyperlink to access the corresponding sequence diagram $103_A$. In other embodiments, the sequence diagram $103_A$ may be displayed within document 605 at the corresponding reference 604.

Figure 7:
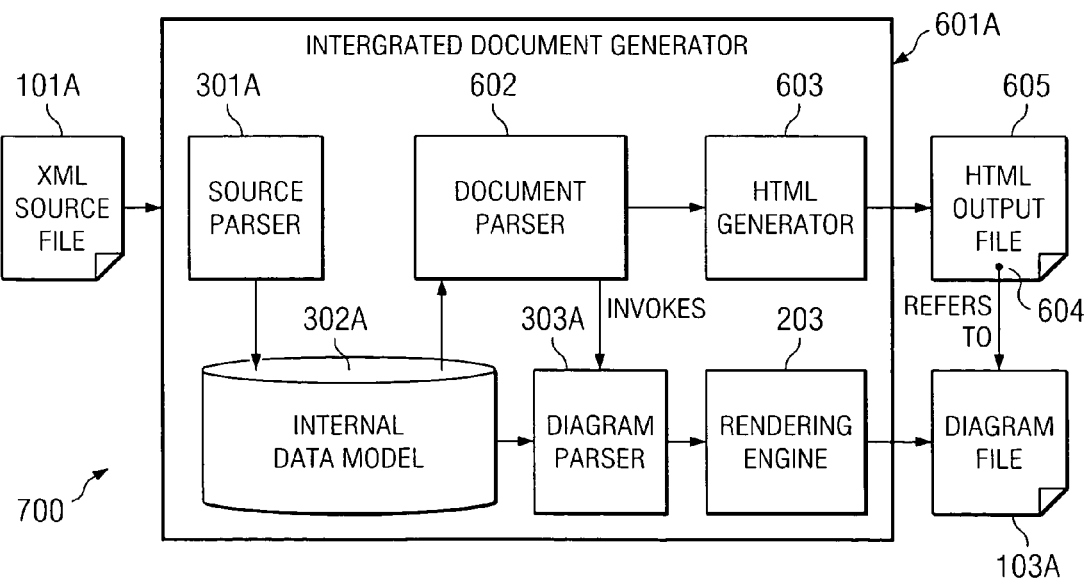
FIG. 7 shows an exemplary system in which a sequence diagram generator is integrated within a document generator application.

Turning to FIG. 7, an exemplary system 700 is shown in which a sequence diagram generator is integrated within a document generator application $601_A$. In this case, the features of the diagram generator are integrated with the document generator $601_A$. The input source file $101_A$ is parsed once by source parser $301_A$, and the document parser 602 and the diagram parser $303_A$ share the common internal data model $302_A$. Thus, source parser $301_A$, in this example, parses the textual content information and the sequence diagram information contained in the source file $101_A$, while maintaining the relationships and hierarchy of such source file $101_A$. The document parser 602 invokes the diagram parser $303_A$ for each sequence diagram definition found in the input source file $101_A$.

In one sense, this document generator configuration of FIG. 7 is a simpler solution as it eliminates the need to communicate information between two separate applications to identify the input file and the desired output file name and location for each generated sequence diagram. All this information is now contained within the one application.

The sequence diagram generator and document generator are, in one embodiment, software code stored to computer-readable media and executable by a processor-based device, such as a personal computer (PC). However, it should be understood that the elements of the sequence diagram generator and document generator described above may be implemented in software, hardware, and/or a combination thereof.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for generating sequence diagrams for communications protocol transactions independently of domain-specific encoding of data for said transactions, the system comprising:

an application-generic sequence diagram generator, wherein said application-generic sequence diagram generator includes:
 a parser that dynamically receives data comprising message packets captured by a protocol analyzer application; and
 a rendering engine that generates a sequence diagram representing a flow described by said received data, wherein the sequence diagram includes a graphical representation of a series of transactions between two or more actors, wherein the actors comprise entities that exchange message packets in communications protocol transactions and wherein:
  each of the two or more actors is represented by a vertical line;
  time is represented by a vertical progression down the vertical lines;
  transactions are represented by message packets exchanged between the two or more actors; and message packets are represented by directional horizontal lines between the vertical lines of actors and a label corresponding to each directional horizontal line denotes the message packet being transmitted; and wherein said rendering engine includes an application programming interface (API) that presents an abstraction for drawing sequence diagrams independent of domain-specific applications and wherein said parser maps between domain-specific encoding in said received data and the API presented by the rendering engine.

2. The system of claim 1 wherein said received data is in a non-proprietary language.

3. The system of claim 2 wherein said non-proprietary language comprises Extensible Markup Language (XML).

4. The system of claim 1 wherein said parser includes a source parser reads said received data and builds an internal data model representing diagram metadata.

5. The system of claim 4 wherein said source parser identifies, in said received data described actors and a sequence of message packets communicated between the actors.

6. The system of claim 5 wherein said internal data model includes said diagram metadata corresponding to the identified actors and sequence of message packets.

7. The system of claim 4 wherein said parser includes a diagram parser operable to process said internal data model and generate corresponding drawing commands.

8. The system of claim 7 wherein said rendering engine receives said drawing commands and generates said sequence diagram representing said flow described by said received data.

9. The system of claim 8 wherein said sequence diagram is provided via a graphical user interface that allows a user to edit said received data on-screen and generate another sequence diagram on demand that reflects a change made to said received data.

10. A method for automatically generating updated sequence diagrams for communications protocol transactions in response to user changes to sequence diagram source data, the method comprising:

in a computer:
loading a textual source file into an intermediate variable and displaying content of the intermediate variable in a graphical user interface as editable text, wherein said textual source file is in non-proprietary language and describes a flow for a communications protocol generated by a software application;

building, by a source parser executed by the computer and based upon said intermediate variable, a data model for a diagram of said flow described by said textual source file;

generating, by a diagram parser executed by the computer and based on said data model, corresponding drawing commands;

responsive to said drawing commands, rendering by a rendering engine executed by the computer a sequence diagram representing said flow described by said intermediate variable as editable text, wherein the sequence diagram includes a graphical representation of a series of transactions between two or more actors, wherein the actors comprise entities that exchange message packets in communications protocol transactions and wherein:

each of the two or more actors is represented by a vertical line;

time is represented by a vertical progression down the vertical lines;

transactions are represented by message packets exchanged between the two or more actors; and message packets are represented by directional horizontal lines between the vertical lines of actors and a label corresponding to each directional horizontal line denotes the message packet being transmitted;

allowing a user to edit said content of said intermediate variable via said graphical user interface; and generating, by said diagram parser and based upon said edited content of said intermediate variable, an updated sequence diagram reflecting a change made by said user.

11. The method of claim 10 wherein said non-proprietary language comprises a markup language.

12. The method of claim 10 wherein said non-proprietary language comprises Extensible Markup Language (XML).

13. The method of claim 10 wherein said textual source file is independent of said software.

14. The method of claim 10 wherein said building said data model by said source parser comprises:

identifying in said intermediate variable described actors and sequence of message packets communicated between the actors.

15. The method of claim 14 wherein said building said data model by said source parser further comprises:

including in said data model information corresponding to the identified actors and sequence of message packets.

16. The method of claim 10 wherein said source parser, diagram parser, and rendering engine are operable to generate said sequence diagram representing the flow of any software application described in said textual source file.

17. The method of claim 10 wherein said receiving into said source parser said textual source file comprises:

receiving at least one textual source file into said source parser responsive to a command-line command.

18. A computer program which is executed in the computer and which, while being executed, performs the method of claim 10.

* * * * *